Figure 1:
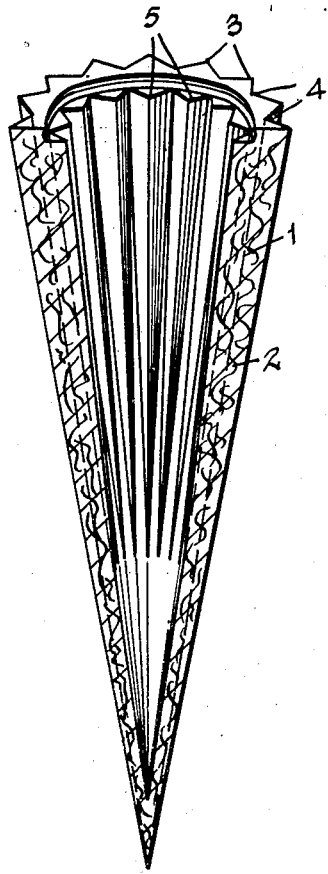

Feb. 20, 1934.     A. KADOW     1,948,117

FERTILIZER CONTAINER FOR PLANTS

Filed June 11, 1932

Inventor
August Kadow

Patented Feb. 20, 1934

1,948,117

UNITED STATES PATENT OFFICE 1,948,117

FERTILIZER CONTAINER FOR PLANTS

August Kadow, Toledo, Ohio, assignor to The Green Cross Development Corporation, Toledo, Ohio, a corporation of Ohio Application June 11, 1932. Serial No. 616,734

9 Claims. (Cl. 47—48)

My invention relates to containers for fertilizers by which the fertilizer may be placed in the soil proximate to the roots of a plant or seedling. My invention particularly relates to containers for containing fertilizer that may be absorbed by the soil through the walls of the container to supply the soil with desirable chemical elements and produce in the soil the desired plant food content.

The prime purpose of the invention is to provide a container having walls of various thickness and formed of a material of high porosity to dispense a soluble fertilizing material. Another object of the invention is to provide a container for containing fertilizing chemicals having walls of such shape as to direct the roots through the walls and prevent wrapping or balling of the roots about the container. A further object of the invention is to provide a container formed of material normally collapsible, having relatively thin walls, but shaped so as to withstand relatively great strains whereby the container walls tend to resist the crushing and lateral pressure of the soil as the container is emptied by dispensation of chemicals packed within the container, and whereby the container may be forcibly inserted into the ground or plant soil without the necessity of employing the conventional soil forming tool. Another purpose of the invention is to provide a container having characteristics of porosity and ease of root penetration similar to those of the soil, whereby moisture may pass to and from the container to diffuse chemicals or fertilizer from within the container to the soil to slowly acclimate the plant life within the soil to the chemical dispursed by the container and whereby the roots of the plant or seedling may eventually penetrate into the container to draw directly upon the fertilizer therein, after the plants have become accustomed to the presence of the chemical in the soil. A still further object of my invention is to provide a container of a convenient shape which may be readily inserted in the soil.

The invention consists in other features and advantages which will appear from the following description and upon examination of the drawing. Structures containing the invention may partake of different forms and may be varied in their details of construction and still embody the invention. To illustrate a practical application of the invention, I have selected a container embodying the invention as an example of the various structures and details thereof that contain the invention and shall describe the selected structure hereinafter, it being understood that variations may be made without departing from the spirit of the invention. The particular structure selected is shown in the accompanying drawing.

Figure 2:
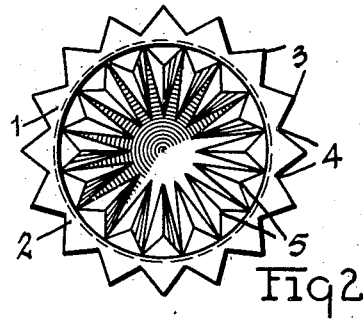
Figure 3:
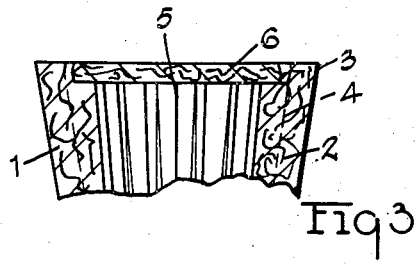
Figure 4:
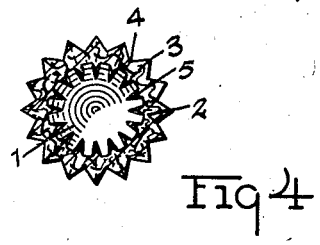

Fig. 1 of the accompanying drawing illustrates a perspective view in cross section of the preferred form of the container. Fig. 2 illustrates an end view of the container illustrated in Fig. 1. Fig. 3 illustrates a cross sectional view of the open end of the container and a suitable closure means. Fig. 4 illustrates a transverse view in cross section and shows the relative thickness of the container at a point midway between the ends of the container.

As is well known, plant life exists and thrives on sustenance obtained from the soil of its habitat. It is also well known that this sustenance or food is derived from the chemical content, such as the potassium or nitrogen content of the soil, and that after a period of growth or bearing of fruit or flora, the chemical content within the soil is depreciated or utilized by the plant to such an extent that in order to secure subsequent adequate fruition or enfloration, it is necessary to refurnish the soil with those chemicals which have been withdrawn. It is a common practice, therefore, to provide such expediencies as cover crops which of their nature contain or will, through chloroplastic action, create such chemicals as is required by the soil. Another form of renovating the soil is to supply the chemicals directly to the soil by furrowing and spreading a thin layer of the chemicals over the furrowed surface. After this operation the layer is turned under by a subsequent furrowing operation. Both of these methods have been found objectionable because of the waste and loss of chemical in the case of spreading and the loss of time required for the conversion of the chemical to a usable form in the case of the cover crops as compared to the beneficial results to the plants to which it is necessary to supply the chemical.

By supplying the chemical fertilizer in containers partaking of the features of my invention, the fertilizer may be located proximate to the roots of the plant life so as to supply the soil within the immediate locality of the plant with the required content.

By the use of my invention, the fertilizer chemicals are supplied to the soil in such quantities as are required by the soil to maintain a desirable ratio content of the soil over a period of time. The chemicals are diffused through the walls of the container in such amounts as to prevent the corrosive or deleterious effect of the fertilizer chemicals on the plants and roots which would take place were an excessive quantity of the same fertilizer chemicals exposed openly and immediately to the soil, as these chemicals readily form relatively strong acids which will react, if given opportunity, with the salts existing in the soil to form desirable humates or salts of humic acids. It is well known, therefore, that such chemicals must be introduced to the soil, and to the plants existing on the soil, in small quantities or with increasing gradual strength so as to permit the humic acids to form the desirable salts or humates. As the plants and the roots thereof become accustomed to the presence of the increased chemical content of the soil, the amount or ratio of chemicals in the soil may be gradually increased so as to satiate the plants with the humates, thereby increasing the bearing capacity of the plants. The container walls have portions of various thicknesses and are shaped so as to direct the roots of the plant through the thinner portions of the wall so that the root may penetrate the container and draw directly upon the chemicals within the container. The walls of the container are also of such shape as to strengthen the container and enable it to be thrust into the soil after the fashion in which stakes are put in the soil and when located in the soil will withstand ordinary lateral soil pressures upon the surfaces of the walls of the container.

In the accompanying drawing, a conical shaped container 1 is shown for purposes of illustration. The container is formed of a molded fibrous and plastic material of high porosity which likewise will present little resistance to the penetration and growing movements of roots through the walls of the container. The fibers of the materials from which the container is formed are preferably shredded and in haphazard and loose arrangement being held together by some suitable root penetrable glutinous binding agent or by the enmeshment of the fibers themselves. Such material as molded penetrable or wood pulp and the like is found to be especially desirable and of low cost. The walls 2 of the container preferably have corrugated surfaces or a plurality of ridges 3. The walls 2 may have smooth surfaces on the inside or be ribbed in the same fashion as the outside surfaces are ribbed, and as illustrated at 5. It has been found in practice that it is desirable that, if the inside surface of the walls 2 be ribbed, the high points of the ribbed surface be located opposite to the high points of the outer ribbed surface of the wall. Consequently, by so forming the walls there will be low points, such as the points 4, forming areas of a decreased thickness as compared to the thickness of the wall at the high points through which the roots may more easily penetrate, and alternating areas of increased thickness of material which will resist the tendency of the material from which the container is made from being collapsed or broken by the application of pressure thereto, and enable the container to be forcibly thrust easily into the ground, and resist the lateral pressure of the earth about it. Thus, a fertilizing chemical or combination of chemicals may be placed within the container and the container located in the soil. If desired, the container may be provided with a cap 6 which fits and closes the open end of the container in a manner well known in the art.

When the container enclosing the fertilizer chemicals is so located in the ground, the moisture in the ground will be drawn toward and through the container walls, due to the absorbent and capillary characteristics of the walls of the container. As the moisture enters the container, it will mix with the chemicals retained within the container to dissolve or float the fertilizer chemicals so as to move the ferilizer chemicals upon the movement of the moisture. The fertilizer chemicals will be diffused and moved through the walls by the existence of an osmotic pressure which will be set up on opposite sides of the walls of the container by reason of the presence of moisture on the inside of the container having a greater content of dissolved fertilizer chemicals and the moisture on the outside of the wall of the container having a lesser amount of chemical content. As the fertilizer chemicals are diffused through the walls of the container, they will readily combine with other elements existent in the soil and, under the influence of catalytic agents, such as bacteria, form humates or salts which are beneficial to plant life existent in the surrounding soil.

After a period of time the roots of the plant life will, by reason of the existence of an area in which an increased food supply is located, be attracted toward that area and toward the container and consequently will be inclined to grow toward the area and toward the container. Consequently, some of the roots will grow so as to abut the walls of the container and endeavor to penetrate the walls of the container. If it were impossible for the roots to penetrate the container or the exterior walls of the container were smooth and not provided with ridges 3, the roots would tend to be returned upon themselves or would be inclined to wrap and ball themselves about the outside surface of the walls of the container. However, when the roots of the plant abut the surfaces of the walls of my container described and shown herein for purposes of illustration, they will be guided by the inclined surfaces of the ridges 3 toward the low points 4 and toward the thinner portions of the walls of the container and will thus have slight resistance to overcome in their penetration of the walls of the container and in reaching the chemical fertilizer concentrate on which they may feed directly. The container, after the contents of the container have been utilized, may be removed or be left to disintegrate or decompose. If the container is left in the soil, it will provide no obstacle to subsequent planting or working of the soil, as it will be returned to a natural pulverized state and will be washed away by the elements.

I claim:

1. In a container for containing soil fertilizing chemicals, and forcibly insertible in the soil, the container having a porous substantially conical wall, the exterior surface of the wall having ridges extending lengthwise of the container for reenforcing the wall against the pressure of the soil when inserted in the soil.

2. In a container for containing soil fertilizing chemicals, the container having a substantially conical wall, the wall formed of a molded and dehydrated fibrous plastic, and having ridges extending from end to end for reenforcing the walls of the container.

3. In a container for containing plant root fertilizing chemicals, the container having a porous wall penetrable by growing plant roots, the outer surface of the wall having angular corrugations for directing the plant roots into the container.

4. In a container for containing plant soil fertilizing chemicals, the container having porous walls, the walls having converging portions, the converging portions having ridges which progress from the point of convergence toward the body of the container whereby the container may be forcibly inserted into the plant soil.

5. In a container for containing plant soil fertilizing chemicals, the container having converging walls formed of a molded dehydrated fibrous plastic, the walls having surface ridges extending substantially in a longitudinal direction from the point of convergence whereby the container may be forcibly inserted into the plant soil.

6. In a container for containing plant root and soil fertilizing chemicals, the container having walls formed of molded dehydrated fibrous plastic penetrable by growing plant roots, the walls having converging portions, the converging portions having ridges extending from the point of convergence toward the body of the container, the ridges having plane surfaces intermediate the base and crown of the ridges, the surfaces being adapted to guide the growing roots toward the base of the ridges.

7. In a container for containing plant root and soil fertilizing chemicals soluble in water, the container having walls formed of a porous fibrous material, the outer surface of the walls having ridge portions which extend into the soil upon insertion of the container into the soil whereby moisture may be readily transmitted through the walls to within the container to dissolve the fertilizing chemicals and the dissolved fertilizing chemicals may be readily dispensed to the plant soil.

8. In a container for containing plant root and soil fertilizing chemicals, the container having porous walls penetrable by growing roots, the inner surface of the walls having ridges, the outer surface of the walls also having ridges, the ridges on the outer wall surface located with reference to the ridges on the inner surface to form alternate thin and thicker wall portions, the outer ridges having surfaces tending to guide the growing plant roots to the areas of decreased thickness.

9. In a container for containing plant soil fertilizing chemicals, the container having a conically shaped wall formed of a molded dehydrated fibrous plastic, the outer surface of the wall having longitudinal ridges extending from the apex to the base of the said conically shaped wall whereby the container may be forcibly inserted progressively from the apex into the plant soil.

AUGUST KADOW.